United States Patent [19]
Sullivan

[11] 3,860,040
[45] Jan. 14, 1975

[54] HOSE CONSTRUCTION

[75] Inventor: Dennis W. Sullivan, Willoughby Hills, Ohio

[73] Assignee: Parker-Hannifin Corporation, Cleveland, Ohio

[22] Filed: Mar. 7, 1973

[21] Appl. No.: 338,860

[52] U.S. Cl. ............... 138/124, 138/132, 138/137
[51] Int. Cl. ............................................. F16l 11/08
[58] Field of Search .......... 138/137, 125, 118, 124, 138/153, 132, 141, 144; 156/143, 244

[56] References Cited
UNITED STATES PATENTS

| | | | |
|---|---|---|---|
| 2,143,852 | 1/1939 | Anderson | 156/143 |
| 3,045,281 | 7/1962 | Skobel | 156/244 X |
| 3,168,910 | 2/1965 | Galloway et al. | 138/137 |
| 3,233,024 | 2/1966 | Jackson et al. | 138/137 |
| 3,314,449 | 4/1967 | Krone et al. | 138/125 |
| 3,383,258 | 5/1968 | Houlston | 138/125 X |
| 3,460,578 | 8/1969 | Schmid | 138/125 |
| 3,682,201 | 8/1972 | Atwell et al. | 138/125 |
| 3,756,890 | 9/1973 | Galloway et al. | 156/244 X |
| 3,814,138 | 6/1974 | Courtot | 138/124 |

Primary Examiner—Richard C. Queisser
Assistant Examiner—Daniel M. Yasich
Attorney, Agent, or Firm—John N. Wolfram

[57] ABSTRACT

A flexible hose construction comprising a core tube having axial striations about its periphery, an adhesive within said striae, and an outer layer of flexible material bonded by said adhesive to the core tube. The invention also covers the method of making the hose comprising the steps of forming the core tube with axial striations, dipping the tube into a bath of adhesive, and applying a layer of flexible material over the core tube to be bonded thereto by the adhesive.

5 Claims, 6 Drawing Figures

PATENTED JAN 14 1975

3,860,040

HOSE CONSTRUCTION

BACKGROUND OF THE INVENTION

In the art of making flexible hoses having a core tube covered by one or more layers of additional flexible material, such as braided reinforcement or a sheath of material different from the core tube, it is sometimes desirable to bond the core tube to the adjacent layer. A well known method of accomplishing this is to pass the core tube through a bath of liquid adhesive to be coated by the same and then pass the coated tube through either a braider if the next layer is to be braided reinforcement, or through a cross head type extruder if the next layer is to be an extruded sheath. In either case, when the coated tube leaves the bath of liquid adhesive and moves horizontally to the braider or cross head, the liquid tends to run from the upper side of the tube to the bottom, resulting in a thicker coating of adhesive on the bottom than on the top. Obviously, this is undesirable and may result in too much adhesive on the bottom and not enough on the top and perhaps making it necessary to employ a device for stripping the excess from the bottom side before the next layer is applied.

SUMMARY OF THE INVENTION

According to the present invention, the core tube when extruded is formed with axially extending striations about its outer periphery. The tube is then passed through a bath of liquid adhesive which enters the striae. When the tube leaves the bath and proceeds horizontally to the next station, the liquid adhesive tends to stay within the individual striae within which it is contained and does not run from the top side of the tube to the bottom side. Consequently, there will be a substantially uniform distribution of adhesive about the tube's periphery for bonding the next layer of flexible material to the core tube.

DETAIL DESCRIPTION

Figure 1:
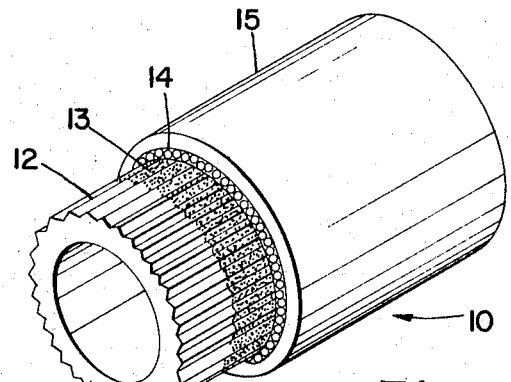
FIG. 1 illustrates the hose construction with the striated core tube.
Figure 5:
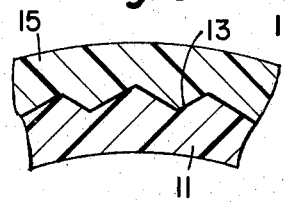
FIG. 5 is a fragmentary cross section view showing the cover applied directly to the core tube.
Figure 2:
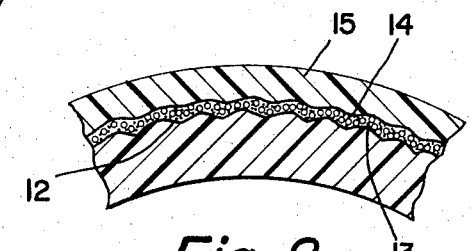
FIG. 2 is a fragmentary cross section of the hose illustrating the striae more clearly.
Figure 6:
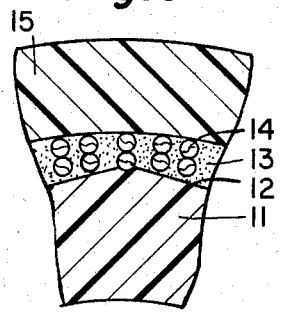
FIG. 6 is a fragmentary section view showing flattening of the striations by the reinforcement.
Figure 4:
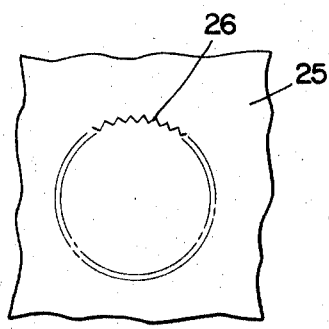
FIG. 4 is a view of the extruder orifice for forming the striations.
Figure 3:
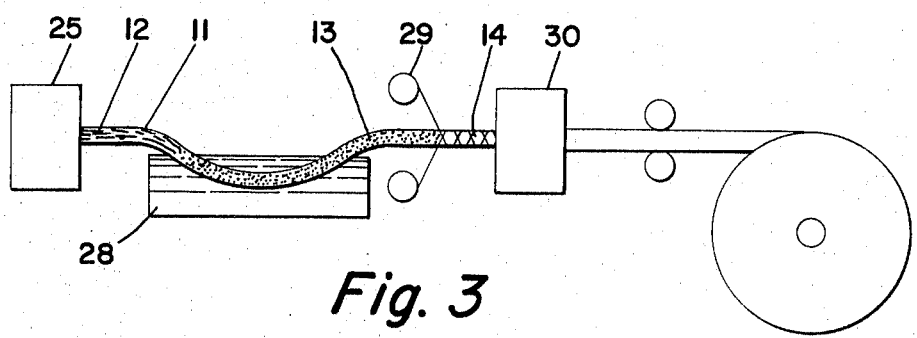
FIG. 3 illustrates the method of making the hose.

As shown in FIGS. 1 and 2, a hose 10 includes a flexible core tube 11 of nylon or other plastic or elastomeric material. The core tube has axially extending striations 12 formed in its exterior surface. Within the striations is an adhesive material 13, such as Adiprene L–100 made by E. I. DuPont Chemical Corporation, that bonds the core tube to a layer of braided reinforcement material 14 that may be of yarn made from nylon, dacron, or other material. Another layer or sheath 15 of nylon, urethane or other flexible plastic material may be over the reinforcement.

To construct the hose as illustrated, the core tube 11 is extruded from a conventional extruder 25 for making plastic tubing. The ejection orifice of the extruder is provided with serrations 26 which form the axially extending striations in the core tube as the latter is extruded from the ejection orifice.

The core tube is then passed through a bath 28 of liquid adhesive. The adhesive enters the striations and remains therein as the tube moves horizontally after leaving bath 28 and does not run to the bottom side of the tube as the latter moves to a braiding device 29 which applies the braid layer 14 which then becomes bonded to the core tube by means of the adhesive within the striations 12. The tube is then passed through a cross head 30 within which sheath 15 is extruded over the reinforcement 14.

Obviously, either the reinforcement or the sheath may be omitted if desired. In the former case, the sheath would be bonded to the core tube.

The striations 12 are preferably of approximately 0.015 inch to 0.025 inch width and of about 0.005 inch depth. Their cross section may be of various shapes but in general are preferred to be of V shape.

When both a reinforcement and a sheath are employed, the reinforcement may be in the form of knit or spirally wrapped yarn rather than braided yarn.

Braid 14 is applied to the core tube with predetermined tension on the yarn so that the braid will have some hoop stress tending to contract it upon the core tube. This causes a slight flattening of the outer ridges of the striations whereby the striations will be shallower than initially formed and the adhesive will be squeezed into the interstices of the braid for improving the bond.

I claim:

1. A hose construction comprising a core tube of flexible material and having generally axially extending striations about its outer periphery, said striations containing discrete adhesive in contact with the surface thereof, and a layer of flexible material surrounding the core tube, said layer including first portions extending into said striations and other portions exterior of said striations, said layer being bonded to said core tube by said adhesive, said striations comprise raised ridges with recesses therebetween, said layer comprises a tensioned reinforcement of flexible yarn that slightly flattens said ridges of said striations whereby said first portions substantially fill said recesses and substantially uniformly distribute the adhesive therein, and the striations are initially of a depth less than the thickness of said layer.

2. A hose construction comprising a core tube of flexible material and having generally axially extending striations about its outer periphery, said striations containing discrete adhesive in contact with the surfaces thereof, and a layer of flexible material surrounding the core tube, said layer including first portions extending into said striations and other portions exterior of said striations, said layer being bonded to said core tube by said adhesive, said layer comprising an extruded sheath of flexible material having internal striations generally complementary to the striations of said core tube and providing said first portions.

3. The hose construction of claim 1 in which the striations are initially of about 0.005 inch depth and of from about 0.015 inch to 0.025 inch width.

4. The hose construction of claim 1 in which said striations are initially occupied solely by said adhesive and there is another layer of flexible material over said reinforcement and having striations on its internal surface substantially complementary to the striations on said core tube.

5. A hose construction comprising a core tube of flexible material and having generally axially extending striations about its outer periphery, said striations initially having side edges forming raised ridges with recesses therebetween, a layer of reinforcement yarn about said core tube and in tensioned engagement with said ridges so as to flatten the same whereby said yarn will enter said recesses, said yarn comprising strands with interstices therebetween, and a discrete adhesive in said striations in contact with said core tube and said reinforcement and bonding the same to each other, some of the adhesive being displaced from the striations into said interstices, and said striations having an initial depth of about 0.005 inch whereby said yarn will be less than 0.005 inch from all surfaces of said striations after said flattening of said ridges.

* * * * *